Aug. 25, 1964  I. JEPSON ETAL  3,145,645
TOASTER
Filed Dec. 30, 1959  6 Sheets-Sheet 4

Inventors
Ivar Jepson
Ludvik J. Koci
Fred O. Ottosen
Chester H. Wickenberg
By George R. Clark
Atty.

Aug. 25, 1964

I. JEPSON ETAL 3,145,645

TOASTER

Filed Dec. 30, 1959

Inventors.
Ivar Jepson
Ludvik J. Koci
Fred C. Ottosen
Chester H. Wickenberg
By George R. Clark
Atty.

United States Patent Office 3,145,645
Patented Aug. 25, 1964

3,145,645
TOASTER
Ivar Jepson, Oak Park, Ludvik J. Koci, Hinsdale, Fred O. Ottosen, Chicago, and Chester H. Wickenberg, Elgin, Ill., assignors to Sunbeam Corporation, Chicago, Ill., a corporation of Illinois
Filed Dec. 30, 1959, Ser. No. 862,936
3 Claims. (Cl. 99—329)

The present invention relates to toasters, and more particularly to electric toasters of the household type having improved means for controlling the toasting operation thereof.

Specifically, the present invention is an improvement on Koci Patent No. 2,303,561, assigned to the same assignee as the instant application.

The electric toaster is a standard item found in the kitchen of most American homes. The type of toaster extensively sold generally comprises an arrangement in which the bread slices are partially inserted into toasting slots and then a bread carriage is manually or automatically moved to a toasting position where suitable heating elements perform the necessary drying and browning of the bread slices to constitute toasting. Numerous means have been provided to terminate the toasting cycle. The device employed in the above-mentioned Koci patent comprises thermally responsive means such as a bimetallic element which times the toasting cycle in dependence upon the time required to heat and subsequently cool the thermal responsive means. It will be appreciated that termination of the toasting cycle requires deenergization of the heating elements and usually also involves movement of the bread slices to a non-toasting position where they can readily be removed by the operator.

It would be desirable to provide an improved toaster of the type disclosed in the above-mentioned Koci patent which is simple and compact, which can be mass produced at a low cost, and yet wherein the controls function accurately and uniformly on all devices so mass produced, which can be manufactured and sold at low cost, and which will give years of foolproof service.

Accordingly, it is an object of the present invention to provide an improved toaster having the advantages enumerated above.

It is another object of the present invention to provide an electric toaster having improved means for controlling the toasting cycle.

It is another object of the present invention to provide a new and improved electric toaster with foolproof means for controlling the operation thereof.

Another object of the present invention resides in an electric toaster with improved means for actuating the switch means in response to operation of a thermally responsive member.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings, in which.

Briefly, the present invention is concerned with a two-slice so-called "pop up" toaster in which a vertically movable carriage is provided normally biased by spring means to an uppermost or non-toasting position. Means are provided for moving the carriage downwardly to a latched and toasting position. A bimetallic thermal timer element is employed which is of the snap-acting type and which is heated by a heating element serially connected with the heating elements during a portion of the toasting cycle. Upon a predetermined delay occasioned by the requirement of heating the bimetallic element, latch release means are actuated to permit slight upward movement of the carriage to an extent sufficient to actuate a switch which interrupts the energization of the heating element associated with the bimetallic element while leaving energized the heating elements for toasting the bread slices. The bimetallic element is then permitted to cool and upon sufficient cooling actuates the latch means again thereby fully releasing the carriage and terminating the toasting cycle. Adjustable means are provided for calibrating the heating element in a simple manner both initially at the factory and subsequently by the user so as to produce bread slices of the desired degree of brownness. Suitable cushioning means are provided to cushion the movement of the bread carriage and manual release means are incorporated in the means for moving the bread carriage.

Figure 1:
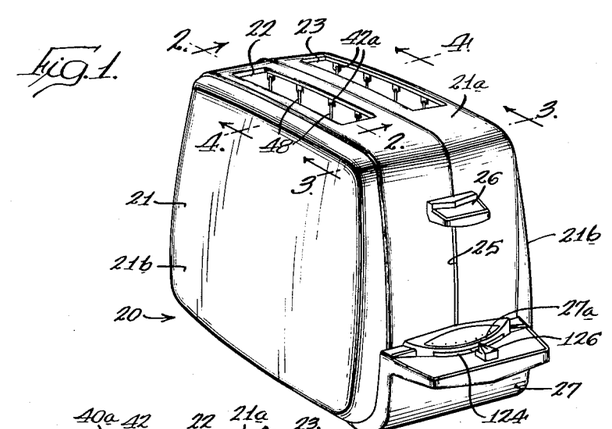
FIG. 1 is a perspective view of an electric toaster embodying the present invention.

Referring now to the drawings there is illustrated in FIG. 1 a bread toaster embodying the present invention generally designated at 20 which toaster comprises an external casing 21 provided with spaced bread slots 22 and 23 for the insertion of slices of bread to be toasted by the toaster 20. The particular design of the toaster 20 forms no part of the present invention but is as disclosed in copending Ernest and Cornwell design application Serial No. D. 50,513, filed April 18, 1958, and assigned to the same assignee as the instant application. As illustrated in the drawings the casing 21 is a suitable three-piece sheet metal casing formed of a U-shaped top member 21a and a pair of substantially identical side members 21b which are jointed together by spot welding or the like to form a unitary casing open at the bottom but provided with the two spaced slots 22 and 23 at the top thereof. The casing 21 is provided at one end with a slot 25 extending in a generally vertical direction slidably to receive therein a movable control lever described in detail hereinafter to which lever there is attached a manually actuatable knob 26 for actuating the bread carriage also described hereinafter.

For the purpose of supporting the toaster 20 and for moving it about there are provided at either end thereof a pair of combined handles and legs, one secured at either end of the toaster 20, generally designated by the reference numerals 27 and 28, respectively. These combined handles and legs are preferably made of a suitable phenolic resin as is also the knob 26 and preferably the elements 26, 27 and 28 are appropriately colored and designed so as to provide a matching appearance.

Housed within the casing 21 and supported by the combined handles and legs 27 and 28 is what might be referred to as the toaster chassis which is a subassembly generally designated by the reference numeral 30 and which comprises essentially all of the toaster except for the casing 21 and the handle supports 27 and 28. The toaster chassis 30 comprises a supporting frame defined by a base 31 of somewhat rectangular configuration comprising parallel channel shaped portions 31a, 31b and 31c (FIG. 11) which define between them a pair of spaced elongated openings 32 and 33 which are disposed in more or less aligned relationship with the bread slots 22 and 23, respectively, so as to permit crumbs and the like to pass through the base 31. The base 31 is also provided with a pair of lateral flanges 31d and 31e provided with suitable notches such as 34 for cooperation with suitable associated flanges on the casing 21 whereby the casing 21 may readily be secured to the base 31 of the chassis 30. The combined handles and legs 27 and 28 are suitably secured to the base 31 either directly thereto or to other means secured to the base.

Figure 4:
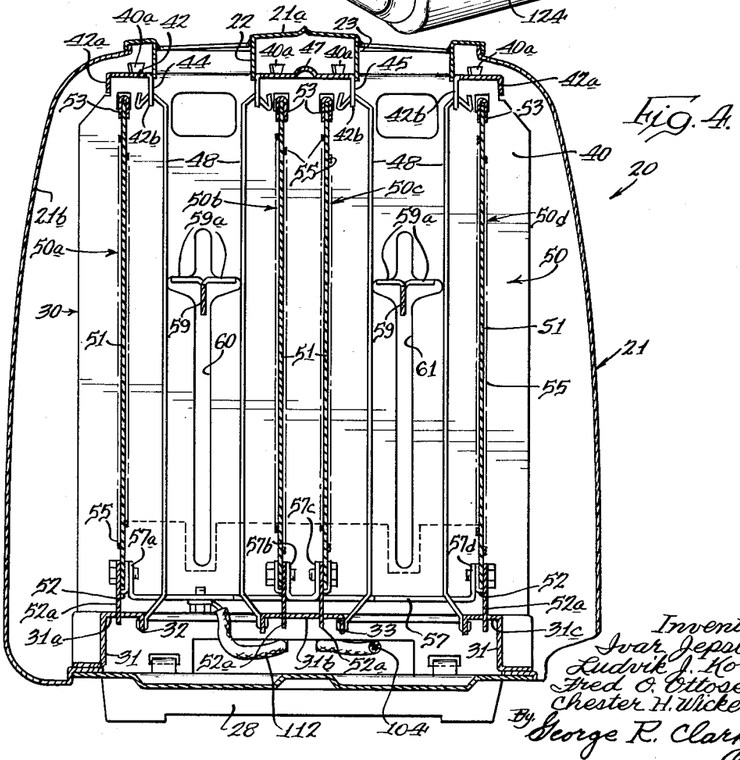
FIG. 4 is an enlarged sectional view taken substantially on line 4—4 of FIG. 1 with the bread carriage and associated mechanism positioned as in FIG. 2.

In addition to the base 31, the frame of the chassis 30 includes identical end frame members 40 and 41 and a top frame member 42 which top frame member like the base 31 is provided with spaced openings 44 and 45 therein, whereby the openings 22, 32 and 44 are more or less aligned and the openings 23, 33 and 45 are more or less aligned, as is clearly shown in FIG. 4 of the drawings. The frame members 40, 41 and 42 and the base 31 are suitably fastened together to define a rectangular structure as by any suitable fastening means such as by spot welding or the like. In an embodiment built in accordance with the present invention the end frame members 40 and 41 were provided with projections receivable in suitable opens in the top frame member 42 such as the projections 40a and 41a which have been deformed so as to lock the frame members in assembled relationship. For the purpose of providing additional strength and for increasing the rigidity, the end frame members 40 and 41 are preferably provided with a plurality of vertical ribs such as 46. The top frame member 42 is also provided with a central rib 47 which increases the rigidity and the edges are downturned parallel to the rib 47 as indicated at 42a thereby also increasing the rigidity.

For the purpose of effectively defining toasting chambers below the slots 22 and 23 there are provided a plurality of vertically disposed guide wires 48, the upper ends of which are supported by a plurality of depending ears 42b integrally formed with the top frame member 42, and the lower ends of which are engageable with suitable notches 49 (FIG. 2) which are defined in the depending flanges defining the channel portions 31a, 31b and 31c of the base 31. These guide wires 48 define the toasting chambers and guide the toast in its vertical movement with the toasting slots 22 and 23 without substantially interfering with the radiation between heating or toasting units described hereinafter and the bread to be toasted.

Figure 2:
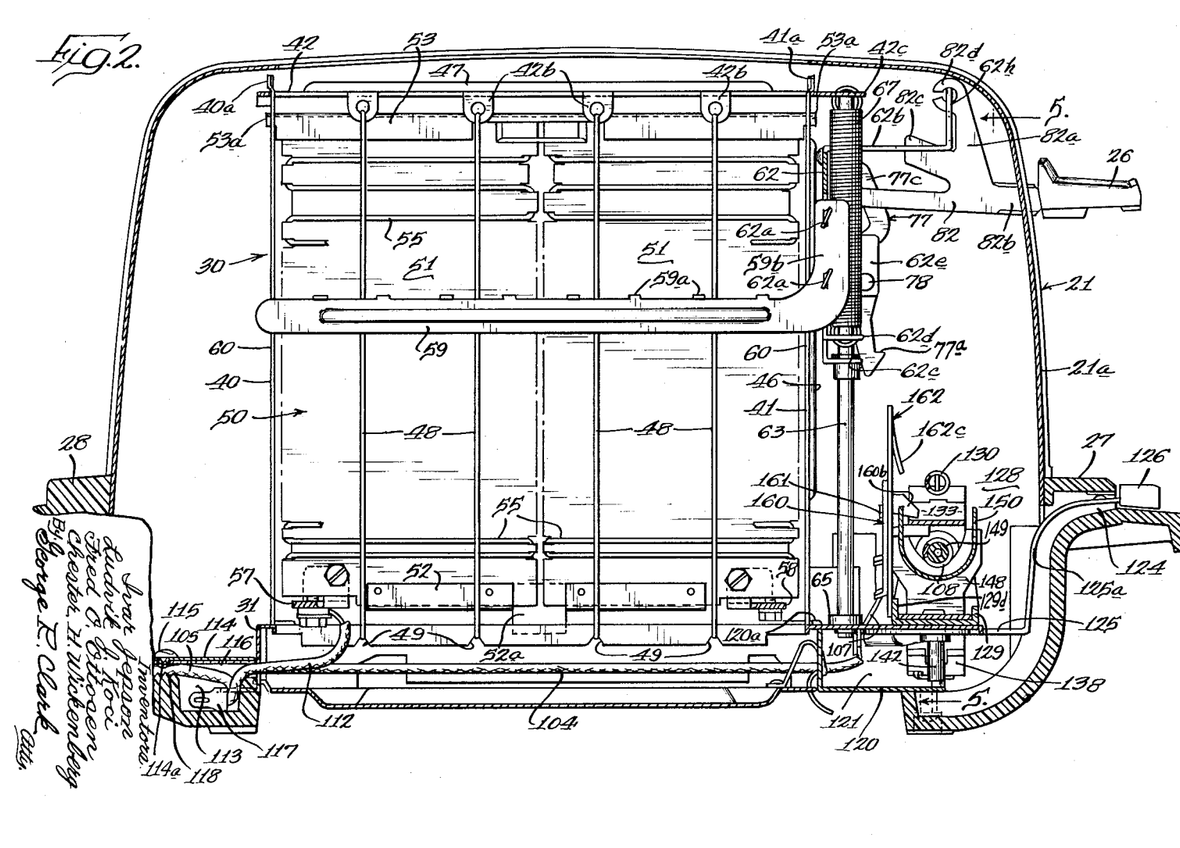
FIG. 2 is a greatly enlarged sectional view taken substantially on line 2—2 of FIG. 1 with the bread carriage disposed in its uppermost position.

In order to perform the toasting operation on all sides of the two slices of bread which are insertable simultaneously in the slots 22 and 23, respectively, there are provided a plurality of heating or toasting units, one for each side of each bread slice to be toasted, which heating units are all identical and are each designated by the reference numeral 50 with an appropriate subscript as 50a, 50b, 50c and 50d. As illustrated, each of the heating units comprises a pair of mica cards 51 disposed in a common plane in side-by-side relationship as best shown in FIG. 2. These cards are supported in this relationship by top and bottom rigid supporting members designated as 52 for the bottom and 53 for the top. These supporting members 52 and 53 are of U-shaped configuration and clamp the top and bottom edges, respectively, of the mica cards 51 in position. To support these heating units within the frame of the toaster chassis 30, the lower supports 52 are each provided with a centrally located tongue or prong 52a insertable in a suitable cooperating slot defined in the base 31, the prong 52a associated with the heating unit 50a being insertable into a slot defined in the channel portion 31a, the prongs 52a for the heating units 50b and 50c being insertable into slots defined in a channel portion 31b and the prong 52a of the heating unit 50d being insertable into a cooperating opening or slot defined in channel portion 31c of the base member 31. The upper ends of the heating units 50a, 50b, 50c and 50d are supported in the frame of the chassis 30 by virtue of extensions 53a at each end of the upper supports 53 which are insertable into cooperating openings defined in the end frame members 40 and 41. A suitable heating element 55 is wound on each of the mica cards 51 only on the side thereof facing the toasting chamber and to offset the effect of convection the turns of each heating unit at the bottom thereof are more closely spaced than at the top in a manner well understood by those skilled in the art.

Figure 12:
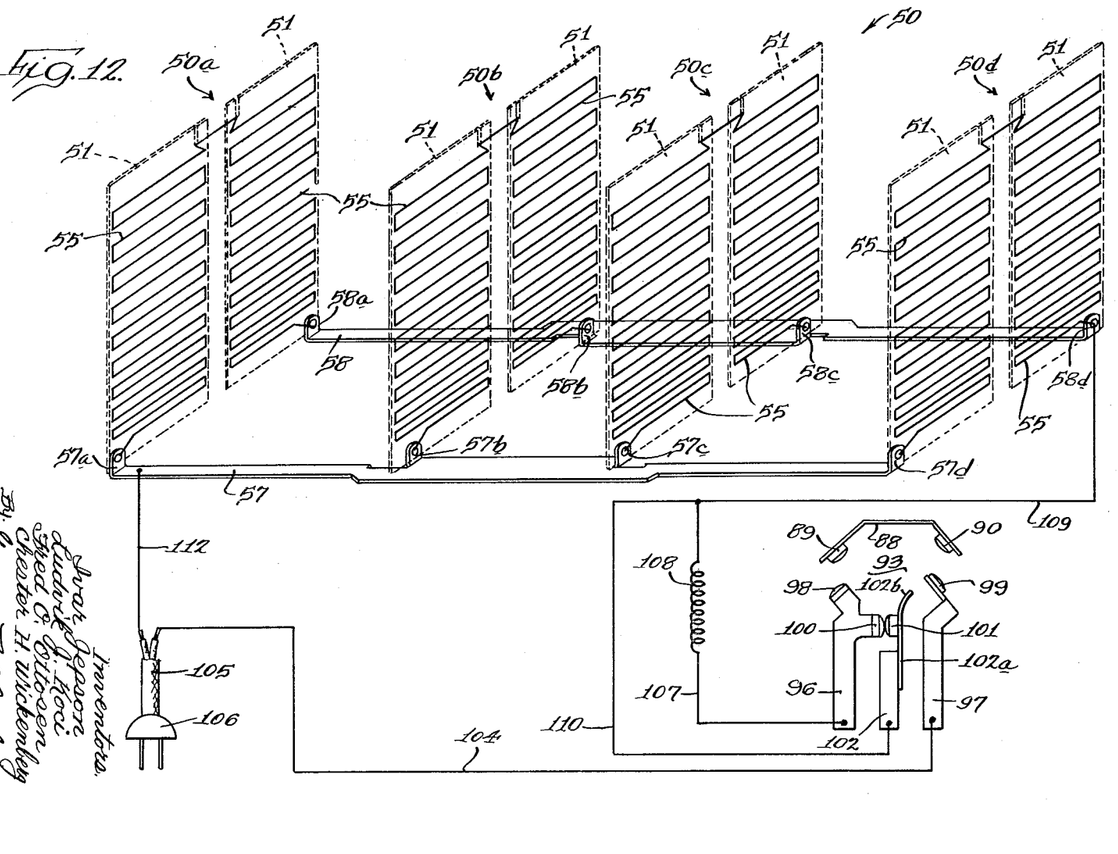
FIG. 12 is a diagram, partly schematic, showing the electrical circuit and controls for the toaster of the present invention with the controls in the position of FIG. 2.

For the purpose of connecting the four heating units 50a, 50b, 50c and 50d in parallel electrically, there are provided two electrical bus bars 57 and 58 which extend across the bottom of the heating elements and are so mounted as to be out of electrical contact with the frame of the chassis 30. One terminal of each heating unit is electrical connected to the bus bar 57 and the other terminal of each heating unit is connected to the bus bar 58. These bus bars 57 and 58 are indentical and, as best shown in FIGS. 4 and 12 of the drawings, are provided with laterally projecting ears such as 57a, 57b, 57c and 57d and 58a, 58b, 58c and 58d by which electrical connection to the associated heating units 50a, 50b, 50c and 50d respectively is made.

In order to support the bread slices between the bread receiving and toasting positions there are disposed in the toasting chambers defined beneath the openings 22 and 23 a pair of horizontally disposed vertically movable bread racks or supports 59 which effectively define the bread carriage. Essentially, each bread rack comprises a central rod or platelike supporting member extending transversely of the toasting chambers having a plurality of laterally extending fingers 59a extending therefrom. The bread racks 59 are sufficiently long so as to extend into a pair of suitable vertical slots 60 and 61 defined in each of the end plates 40 and 41. In order to support the bread racks 59 for movement as a unit, the ends of each bread rack extending through slots 60 and 61 of the end frame 41 each include an upwardly directed portion such as 59b which is suitably secured to a slide bracket 62. This slide bracket 62 is provided with a central section from each end of which a plurality of ears 62a extend receivable in corresponding openings in portions 59b of the bread racks 59. In this way the bracket 62 and the bread racks 59 are united as an integral bread carriage unit. Obviously the racks 59 may be secured to the bracket 62 in any convenient manner.

In order to guide the vertical movement of the slide bracket 62 and the associated bread racks 59, the slide bracket is provided with an upper lateral flange 62b and a lower lateral flange 62c having aligned openings for slidably receiving a guide rod 63 which guide rod is suitably supported at its upper end by the top frame member 42 and at its lower end by the base 31. As illustrated, the guide rod 63 extends through suitable openings defined in these frame members. For accurately guiding the slide bracket 62 along the rod 63 in its vertical movement from a bread receiving to a toasting position, a plurality of elongated bearing members 64a and 64b are associated with the flanges 62b and 62c, respectively, thereby accurately confining the slide bracket to vertical movement along the guide rod 63. Preferably, also the ribs 46 on the end frame member 41 slidably engage suitable deformations on opposite ends of the slide bracket 62 and insure accurate vertical movement thereof without twisting about the axis of guide rod 63.

For the purpose of cushioning the downward movement of the bread carriage including slide bracket 62, a suitable rubber bumper 65 is mounted on the lower end of the guide rod 63 above the base 31 which is engageable by the lower bearing 64b. To bias the carriage to the bread receiving or upper position, there is provided a coiled tension spring 67 which is illustrated as having its lower end engaging a flange 62d provided on slide bracket 62 while the other end is illustrated as engaging an extension 42c of top frame member 42 which is the same extension through which the upper end of guide rod 63 extends.

Figures 3, 11:
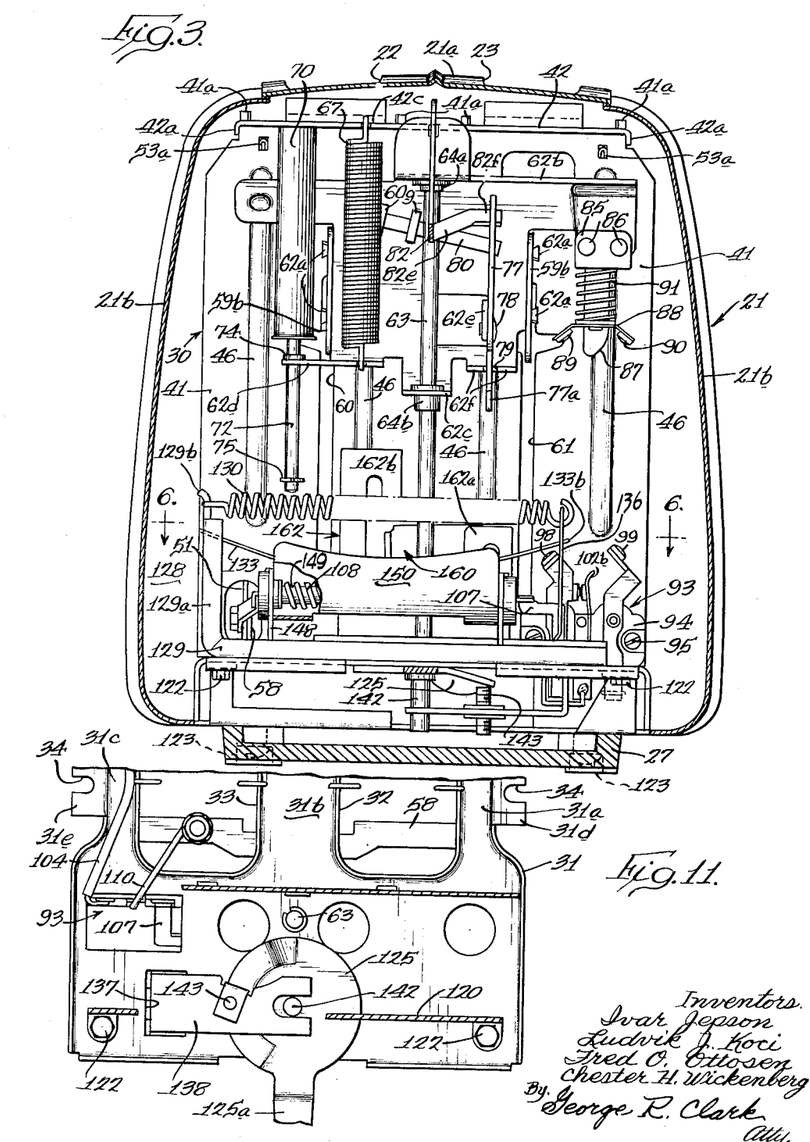
FIG. 3 is a greatly enlarged sectional view taken substantially on line 3—3 of FIG. 1 with the bread carriage positioned as in FIG. 2.
FIG. 11 is a fragmentary bottom plan view taken substantially along the line 11—11 of FIG. 5 but assuming that FIG. 5 shows the complete structure.

In order to prevent the bread carriage including the slide bracket 62 from moving upwardly with too much speed under the influence of tension spring 67, there is provided a dashpot mechanism comprising a vertically extending tube 70 having its upper and effectively closed end secured to the projection 42c of the top frame member 42. A suitable plunger 71 preferably formed of silicone rubber is secured to the end of a piston rod 72 which extends through a suitable opening defined in the flange 62d. A pair of C-rings 74 and 75 are mounted in spaced relationship on the piston rod 72, as best shown in FIG. 3 of the drawings, one above and one below the flange 62d. These C-rings permit limited movement of the piston rod 72 relative to the carriage including the slide bracket 62. In the uppermost position of the toaster carriage the piston 71 will be supported by the engagement of the flange 62d of the slide bracket 62 by the upper C-ring 74 and it will readily be appreciated that the piston 71 acts as a buffer to slow down and cushion the upward movement of the carriage. When the carriage is depressed, because of the spacing between the C-rings 74 and 75, the piston 71 is not pulled downwardly until the carriage is about half way to its lowermost position, thus permitting the operator to freely move the carriage at least initially without any retarding effect of the dashpot. It will be appreciated that the upper end of the tube 70 is perforated to provide a metering orifice for the air forced out of the tubular member 70 by the piston 71. Preferably the slots 60 and 61 include a T-shaped portion which permits ready insertion of the toasting racks 59 which are of somewhat T-shaped configuration, after the frame of the toaster chassis 30 has been assembled.

For the purpose of latching the bread carriage in a toasting position, there is pivotally supported from the slide bracket 62 a trip lever 77 pivotally mounted as indicated at 78 to a vertically disposed lateral flange 62e integrally formed with the slide bracket 62. In order to insure accurate pivotal movement about the axis of the pivot 78, the slide bracket 62 is provided with a bifurcated projecting flange 62f (FIG. 3), the notch between the bifurcations designated as 79 preferably guiding the pivotal movement of the trip lever 77. To perform a latching function the lower end of the trip lever 77 is provided with a hook portion 77a which is engageable with suitable latch members described hereinafter. In order to bias the trip lever 77 into a latching position, there is provided a biasing spring 80 preferably in the form of a flat spring member suitably held in position by a plurality of spaced loops 62g integrally formed with the slide bracket 62. The flat biasing spring 80 is engageable with an integral projection 77b defined on the trip lever 77.

Figure 8:
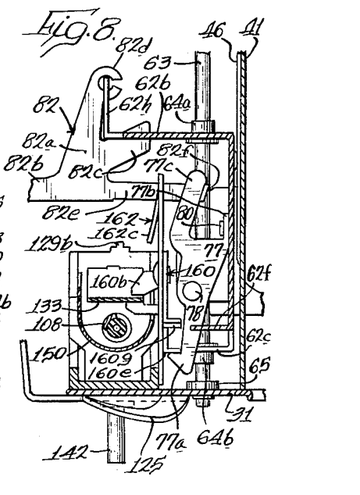
FIG. 8 is a fragmentary sectional view taken on line 8—8 of FIG. 7 assuming that FIG. 7 shows the complete structure.
Figure 10:
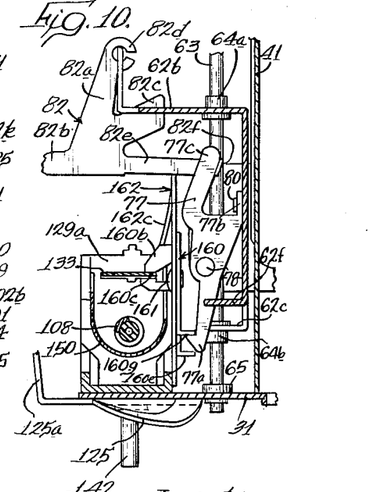
FIG. 10 is a sectional view similar to FIG. 8 but taken on line 10—10 of FIG. 9 assuming that FIG. 9 shows the complete structure.

As was mentioned above, the bread carriage is moved to the toasting position through actuation of the manual knob 26. To accomplish this in a simple manner there is provided what might be designated as a starting lever 82. This starting lever includes a Y-shaped portion 82a extending from a projection 82b to which the knob 26 is secured, which projection 82b extends through the slot 25 in the casing 21 (FIG. 2). One arm of the Y-shaped portion 82a includes at the end thereof a bifurcation 82d pivotally secured to an upwardly directed portion 62h of the projection 62b of the slide bracket 62 (FIGS. 2, 8 and 10). The other arm 82c of the Y-shaped projection 82a of the starting lever 82 extends through a suitable slot defined in the projection 62b which permits pivotal movement of starting lever 82 and yet affords lateral stability to the starting lever 82 and associated knob 26.

In order that the toasting operation may be manually terminated at the will of the operator, the starting lever 82 is provided with a projection 82e terminating in a lateral flange 82f engageable with a projection 77c defined on the trip lever 77. If a force is applied to the knob 26 in an upward direction, pivotal movement of the starting lever 82 about the portion 82d in a counterclockwise direction, as viewed in FIG. 2 of the drawings, in turn causes the projection 82e and lateral flange 82f to move the trip lever 77 in a counterclockwise direction about pivot 78 as viewed in FIGS. 8 and 10 of the drawings, or, in other words, causes release of the hook portion 77a of the trip lever 77 from suitable latching means described hereinafter.

Before considering the thermally responsive control means for controlling the toasting cycle of the toaster 20 of the present invention, the slide bracket 62 will be further described with respect to an electric control element carried thereby. As best shown in FIGS. 3, 5, 7 and 9 of the drawings the slide bracket 62 supports a post of insulating material of somewhat T-shaped configuration generally designated at 85, the head of the T being suitably secured as by fastening means 86 to a depending arm 62k of the slide bracket 62. The lower end of the insulating post 85 is provided with a camming surface 87, the purpose of which will become apparent from the ensuing description. Slidably mounted on the insulating post 85 is a contact bridging member 88 including spaced contacts 89 and 90 electrically interconnected by the bridging member 88. A suitable coiled compression spring 91 biases the bridging member 88 and associated contacts 89 and 90 to a lowermost position relative to the post 85, the compression spring 91 surrounding the post and being interposed between the head of the T-shaped post 85 and the bridging member 88. Suitable stop means 92 limit the lowermost position of the bridging member 88 on the post 85.

Figure 9:
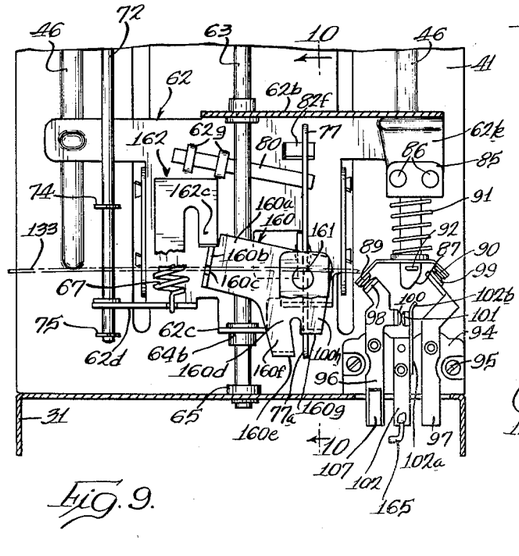
FIG. 9 is a fragmentary view similar to FIG. 7 but with the bread carriage moved to an intermediate but still a toasting position slightly different from the position shown in FIG. 7 of the drawings.

For controlling the electrical circuit of the toaster 20 there is mounted on the frame at the lower portion of the end frame 41 suitable switch means generally designated at 93 (FIG. 12) comprising an insulating support 94 suitably secured to the frame member 41 as by fastening means 95. This insulating support 94 suitably supports a pair of rigid first and second conducting members 96 and 97 which are provided at one end with first and second contacts 98 and 99, respectively. These contacts are so positioned as to electrically engage the contacts 89 and 90, respectively, associated with the bridging member 88 described above when the bread carriage is in predetermined lower positions. In addition, the conducting member 96 also supports a third stationary contact 100 which is electrically engageable with a contact 101 mounted on a resilient or movable arm portion 102a of a conducting member 102 which is also supported on insulating support 94 in spaced relation to rigid conducting members 96 and 97. The resilient contact arm portion 102a is, as best shown in FIGS. 9 and 12 of the drawings, normally biased in a direction to cause contact 101 to engage contact 100. The upper end of the resilient contact arm 102a is provided with a curved portion 102b for engagement with the cam surface 87 on the insulating post 85 so that upon movement of the carriage, including the slide bracket 62 to the lowermost position, the cam surface 87 causes the switch comprising contacts 100 and 101 to be moved to the open position, as clearly shown in FIG. 7 of the drawings.

Figure 7:
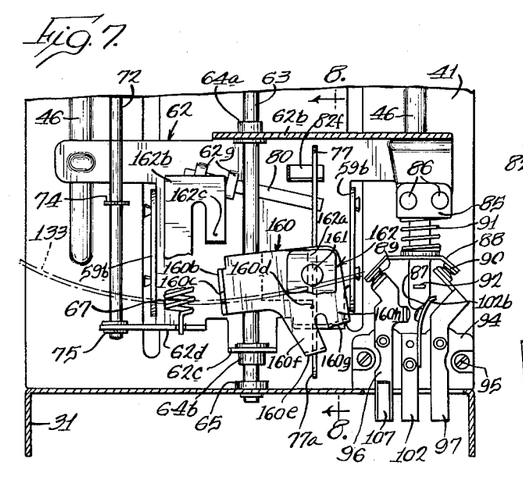
FIG. 7 is a fragmentary view of a portion of FIG. 5 with certain parts thereof cut away more clearly to illustrate the invention.

As best shown in FIG. 12 of the drawings, the contact arm 97 is electrically connected by a suitable conductor 104 with one conductor of a twin conductor power lead 105 which may be provided with the conventional plug connector 106 conventionally employed with appliances in use today. The conducting member 96, on the other hand, is electrically connected by a conducting bracket 107 with one end of a heater coil 108, the other end of which is electrically connected by a conductor 109 with the bus bar 58. The conducting member 102 is, in turn, connected by a conductor 110 with the same bus bar 58 through conductor 109. To complete the electrical circuit, the bus bar 57 is connected by conductor 112 with the power cord 105. With this arrangement it will be apparent that when the switch comprising the contacts 100 and 101 is open and bridging member 88 electrically interconnects contacts 98 and 99, the heater coil 108 is connected in series with the parallel arranged toasting elements 55 employed in the heating units 50a, 50b, 50c and 50d. When, however, the switch comprising the contacts 100 and 101 is opened, as shown in FIG. 7 of the drawings, and while the bridging contact 88 still completes the electrical circuit between contacts 98 and 99 the toasting units remain energized but the heating element 108 is deenergized. Of course, when the bridging contact 88 is moved to the position shown in FIGS. 3 and 12 of the drawings, the toasting elements as well as the heating coil 108 are deenergized.

In FIG. 2 of the drawings the electrical connection between conductors 104 and 112 and the power cord 105 is illustrated, these connections being made in a recess 113 defined in the combined handle and support member 28. To provide the desired strain relief, the twin conductors of the power cord 105 are clamped in restricted openings leading from the recess 113 by means of a suitable cover plate 114 secured to the handle and support member 28 as by fastening means 115. A suitable insulating member 116 of asbestos cloth or the like may be interposed between the cover plate 114 and chamber or recess 113. Any suitable means such as a terminal insulator 117 may be employed to insulate the electrical connections. Preferably the metal plate 114 is provided with a downwardly directed protuberance 114a which engages the twin conductors 105 and forces them into clamping engagement with a roughened portion 118 defined in the handle portion 28.

Secured to the base 31 at the end of the toaster with which the handle 27 is associated is a guard 120 which defines with the base 31 a chamber 121, the purpose of which will become apparent from the ensuing description. Preferably the guard 120 is provided with a plurality of openings through which air may freely circulate. The guard 120 is illustrated as having a plurality of integral tang members 120a which extend through openings in the base member 31 to secure one end of the guard to the base member and then suitable screws or fastening means 122 (FIG. 11) hold the other end or forward portion of the guard 120 in position. The combined handle and support 27 is then, in turn, secured to the guard 120 by suitable fastening means 123 (see FIG. 3 of the drawings). Preferably the handle 27 is provided with an arcuate shaped portion 27a integral with the remainder of the handle defining an arcuate shaped slot 124 (FIGS. 1 and 2) through which a suitable control lever may extend, designated as 125, to the end of which is secured a suitable actuating knob 126. The arcuate portion 27a may be provided with suitable indicia such as "darker" or "lighter" and the operator then can set the color control knob 126 at any desired position.

Figure 5:
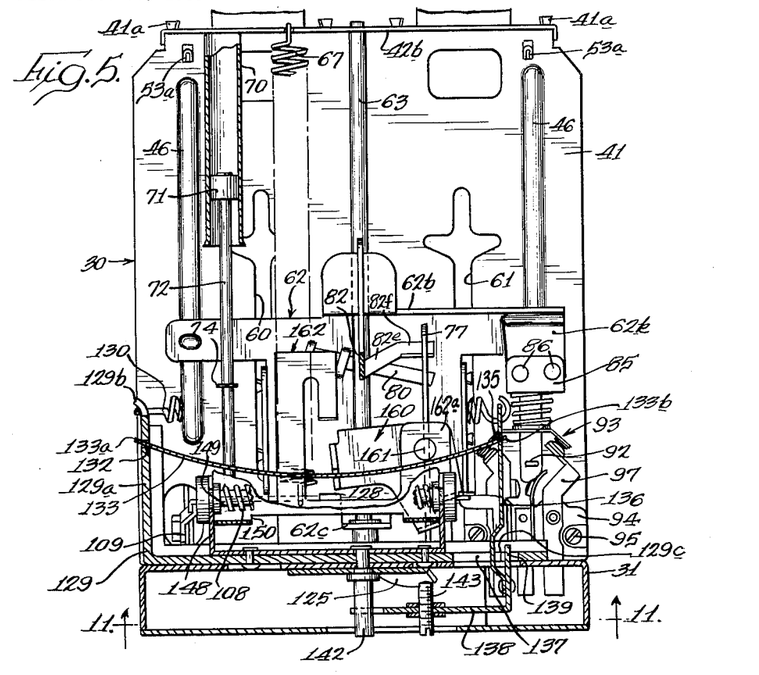
FIG. 5 is a sectional view taken on line 5—5 of FIG. 2 assuming that FIG. 2 shows the complete structure but with the bread carriage disposed in its lowermost and toasting position.
Figure 6:
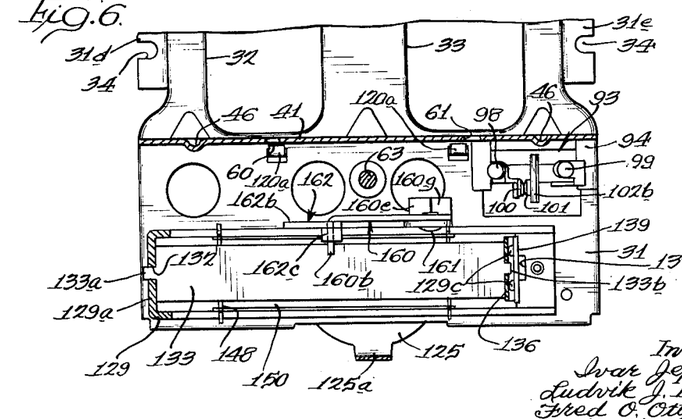
FIG. 6 is a fragmentary sectional view taken on line 6—6 of FIG. 3 again assuming that FIG. 3 shows the complete structure.

For the purpose of controlling the toasting cycle there is mounted on the base 31 above the portion thereof to which the guard 120 is secured a thermal responsive control device generally designated by the reference numeral 128 (FIGS. 3 and 5). This thermal responsive control device includes an L-shaped support 129 formed of somewhat channel-shaped material with the long arm of the L being parallel with the base 31 and suitably secured thereto, as by riveting or the like. Actually, this L-shaped support might be designated as the bimetallic mounting bracket. The upwardly directed arm 129a of this L-shaped support terminates in a hooked shaped portion 129b for supporting one end of a spring 130. The arm 129a further is provided with an opening 132 for receiving a tang portion 133a of a bimetallic element 133. The other end of the bimetallic element 133 includes a similar tang portion 133b insertable in an opening 135 in a vertical arm support 136 of resilient spring material, the upper end of which is connected to the spring 130 which is a tension spring and tends to pull the arm support 136 toward the supporting arm 129a and, hence, apply a longitudinal compressive force to the bimetallic element 133. The lower end of the support 136 extends through an opening 137 in L-shaped support 129 (FIGS. 5 and 6) and is secured to an L-shaped bracket 138 which bracket is pivotally supported as indicated at 139 to the L-shaped support 129. This pivotal support is accomplished by means of tabs or ears 129c (FIGS. 5 and 6) on L-shaped support 129 which extend into suitable openings, not shown, defined in bracket 138. Moreover, pivotal movement of the L-shaped bracket 138 about the pivot point 139 will result in changing the compressive force applied to the bimetallic element 133, primarily by varying the compresive force exerted by the resilient arm support 136, and hence, will change the temperature characteristic thereof whereby it is possible to control the degree of toasting which occurs to bread slices toasted in the toaster 20. Effectively then, the resilient support 136 and the bracket 138 are parts of a toast color control mechanism. So that one may readily adjust the degree of toasting which is desired, there is provided a cam member 125, the arm 125a of which is secured to the color control knob 126. This cam 125 is rotatably mounted about a stud 142 which stud is secured to the support 129 forming a part of the thermal responsive device of the present invention. Rotation of the cam member 125 about the axis of the stud 142 causes the bracket 138 to move about its pivot point 139 by virtue of a cam follower 143 adjustably secured to the bracket 138, as best shown in FIG. 5 of the drawings. Actually the cam follower 143 is adjustably mounted to the bracket 138 in any suitable manner and provides the means by which factory adjustments can be made so that the desired range of toasting may be obtained depending upon the setting of the cam 125.

The heater 108 described in connection with the electrical circuit of FIG. 12 is the heater for the bimetallic element 133 and this heater is suitably mounted as best shown in the drawings immediately beneath the bimetallic element 133. A suitable U-shaped support 148 is provided for supporting the ends of an insulator 149 upon which the heater coil is wound. The electrical connections of the heater coil have already been described. A suitable troughlike reflector 150 is provided to direct the heat produced by the heater coil 108 onto the central portion of the bimetallic element 133.

For the purpose of holding the bread carriage including the slide bracket 62 and the bread rack 59 down against the return bias of the tension spring 67, and for actuating the switch means 93 in proper sequence, there is provided a latch bolt member 160 operatively related to be actuated by the bimetallic element 133 of the thermal responsive control device 128 and cooperating with the hook portion 77a of the trip lever 77 when the slide bracket 62 and bread rack 59 are in their lowermost position. As best illustrated in FIGS. 3 and 7 to 10, the latch bolt member 160 is pivoted about a pin 161 secured to an extension arm 162a of a latch bolt supporting member 162 fixedly secured to a flange 129d of the L-shaped support 129. The latch bolt member 160 has a first arm 160a having a flange projection forming a yoke 160b at one end thereof extending toward the bimetallic element 133 and containing a slot 160c through which the bimetallic element 133 passes. Movement of the bimetallic element 133 moves the yoke 160b to pivot the latch bolt member 160 about the pin 161.

To engage the trip lever 77, the latch bolt member 160 is provided with a Y-shaped arm 160d having a first latch bolt projection 160e at the end of one leg 160f thereof, and having a second latch bolt projection 160g at the end of a second leg 160h thereof. The first latch bolt projection 160e is located to cooperate with the trip lever 77 when the bimetallic element 133 is cold and the bread carriage including the slide bracket 62 is moved down. The second latch bolt projection 160g is angularly displaced from the first latch bolt projection 160e with respect to the pivot pin or point 161 and located radially closer to the pivot point 161 than is the first latch bolt projection 160e. The second latch bolt projection 160g is located with respect to the trip lever 77 so as to cooperate therewith when the bimetallic element 133 is in a heated condition and the latch bolt member 160 has been rotated due to the movement of the bimetallic element 133 in cooperation with the yoke 160b therewith. The latch bolt supporting member 162 includes a second extension arm 162b having a return projection 162c spaced above the yoke 160b of the latch bolt member. The interference or engagement of the return projection 162c with the yoke 160b acts as a stop means and limits maximum upward movement of the center of bimetallic element 133. The member 162 also includes a second stop means for limiting movement of said bimetallic element in the other direction. The location of these two stop means will determine the possible variation of the heating and cooling cycle of bimetallic element 133 by virtue of adjustment of resilient arm 136.

With the above detailed description of the toaster in mind, its operation will now be described. Bread to be toasted is placed through the bread slots 22 and 23 so as to rest on the bread rack 59 and the bread is lowered manually into the toaster by depressing the manually actuatable knob 26 secured to the starting lever 82 to lower the bread carriage to its lowermost position against the return bias of the tension spring 67. As heretofore described, the lost motion connection between the flange 62b of the slide bracket 62 and the piston rod 72 of the dashpot mechanism permits the bread carriage to be moved downwardly initially without the influence of the dashpot mechanism; after the slide bracket 62 has been moved down sufficiently that the flange 62b engages the lower C-ring 75, continued downward movement of the slide bracket 62 is made against the restraining force of the dashpot mechanism.

In order that the bread carriage is held down during the toasting cycle, the trip lever 77 cooperates with the latch bolt member 160. Specifically, the trip lever 77 rotates counterclockwise, as viewed in FIGS. 8 and 10, as the hook portion 77a thereof is cammed over the latch bolt projection 160e of the latch bolt member. After the hook portion 77a has cleared the latch bolt projection 160e, the spring 80 biases the trip lever 77 clockwise, as viewed in FIGS. 8 and 10, to bring the hook portion 77a in locking engagement with the latch bolt projection 160e. As heretofore described, the electrical contacts 98 and 99 are closed by the bridging thereof by the contacts bridging member 88 and the spaced contacts 89 and 90 thereon. Moreover, when the slide bracket 62 is in its lowermost position as illustrated in FIGS. 7 and 8, the cam surface 87 bears against the curved portion 102b of the conducting member 102 to hold open the contacts 100 and 101. In this position, as clearly seen from FIG. 12, the parallel connected heating or toasting units 50 are serially connected with the heater coil 108 associated with the thermal responsive control device 128. The bimetallic element 133 is thereby heated so that its upper surface, as viewed in FIGS. 7 and 9, expands more rapidly than its lower surface and the bimetallic element will snap from a lowered position as illustrated in FIGS. 7 and 8 to an upward position as shown in FIGS. 9 and 10 against the bias of the compressive force applied by the tension spring 130.

In order for the toasting cycle to be dependent upon the time required to heat and subsequently cool the bimetallic element 133, the snapping of the bimetallic element 133 permits the slide member 62 and bread rack 59 to move vertically upwardly from its lowermost position, as illustrated in FIGS. 7 and 8, to an intermediate position, as illustrated in FIGS. 9 and 10, wherein the heating units 50 are connected across the power source but the heater coil 108 associated with the thermal responsive means is effectively disconnected from the circuit. Specifically, heating of the bimetallic element 133 causes it to move to its upper position and to rotate the latch bolt member 160 clockwise due to the cooperation between the central portion of the bimetallic element 133 and the yoke 160b of the latch bolt member 160. This rotation of the latch bolt member 160 moves the latch bolt projection 160e out of engagement with the hook portion 77a of the trip lever 77 and simultaneously moves the second latch bolt projection 160g vertically above the hook portion 77a. The slide bracket 62 moves slightly upwardly under the bias of the tension spring 77 until the hook portion 77a engages the second latch bolt projection 160g. In the intermediate position of the slide bracket 62, the cam surface 88 has moved vertically out of engagement with the curved portion 102b of the conducting member 102 so that the movable contacts 101 supported on the conducting member 102 is brought into electrical engagement with the stationary contact 100. As best seen in FIG. 12, the heater coil 108 is shorted by a conductor 110 so that the heater coil 108 is effectively disconnected electrically from the circuit while the heating units 50 remain electrically in the circuit. As no heat is being supplied to the bimetallic element 133 from the heating coil 108, the element will cool in a predetermined time and will snap back into its original lowered position. Such a return movement of the bimetallic element 133 rotates the latch bolt member 160 counterclockwise as viewed in FIG. 9 and moves the latch bolt portion 160g out of engagement with the hook portion 77a of the trip lever 77. The bread carriage then moves vertically upwardly under the bias of tension spring 67. The upward movement of the bread carriage moves the bread rack 59 to its uppermost position so that the toasted bread projects through the bread slots 22 and 23 from where it may be conveniently removed. The upward motion of the slide bracket 62 also opens the contacts 98 and 99 through the upward movement of the contact bridging member 88, thereby disconnecting the heating units 50 from the electrical circuit.

To provide for raising the bread carriage for removal of the bread prior to the completion of the thermally responsive control cycle, the hook portion 77a of the trip lever 77 may be manually disengaged from the latch bolt projections 160e or 160g. As heretofore described, the starting lever 82 is mounted for limited pivotal motion about the projection 82d. Such pivotal movement of the starting lever 82 in a counterclockwise direction as viewed in FIG. 2 is readily accomplished by lifting up on the manually actuatable knob 26 connected to projection 82b of the starting lever 82, and causes the lateral flange 82f thereof to rotate the trip lever 77 clockwise about pivot 78 thereby disengaging the hook portion 77a thereof from the latch bolt projections 160e or 160g of the latch bolt member 160.

To cushion the upward movement of the bread carriage, the final upward travel of the bread carriage is snubbed or restrained by the action of the dashpot. However, the initial upward movement of the bread rack 59 is unaffected by the dashpot mechanism due to the lost motion connection between the flange 62d of the slide bracket 62 and the piston rod 72. The dashpot mechanism is rendered effective to snub the upward travel of the bread carriage whenever the flange 62d engages the upper C-ring 74 on the piston rod 72.

The color of the toast may be controlled by the color control knob 126 which actuates the cam member 125, as shown, for example, in FIGS. 3, 5, 6 and 11. As heretofore described, movement of the color control knob 126 rotates the control lever or cam member 125 to vary the compressive force applied to the bimetallic element 133 and, hence, to change the temperature characteristic thereof so that the degree of toasting of the bread slices may be effectively controlled.

From the above description it will be appreciated that there is provided a thermal responsive control device 128 in the form of a unitary subassembly all supported from the L-shaped support 129, comprising, in addition to element 129, the elements 108, 125, 130, 133, 136, 138, 142, 148, 149, 150, 160 and 162. Thus this subassembly will not be affected by manufacturing tolerances with respect to the rest of the toaster with the single exception of trip lever 77 and this lever can readily be related to the subassembly.

The improved toaster is simple and compact and may be mass produced at low cost, and the controls thereof function accurately and uniformly. The color of the toast is thereby accurately and dependably controlled. The toasting cycle is dependent upon the time required to heat and subsequently cool the thermal responsive device. Moreover, the toasting cycle may be terminated manually at any time during the toasting operation.

While there has been illustrated and described an improved toaster, including numerous advantageous features as contrasted with prior art arrangement, it will be apparent that numerous changes and modifications will suggest themselves to those skilled in the art, and it is aimed in the appended claims to cover all such changes and modifications as fall within the true spirit and scope of the present invention.

What is claimed as new and desired to be secured by Letters Patent of the United States is:

1. An automatic electric toaster comprising a frame, first electrical heating means carried by said frame, second electrical heating means, a first support having a vertically extending arm, a second support having a resilient vertically extending arm, a bimetallic element supported by said arms and arranged to be heated by said second electrical heating means, spring means biasing at least one of said arms toward the other to exert a compressive force on said bimetallic element whereby said bimetallic element will move between a first and a second position at predetermined temperatures, means for pivoting one of said supports for exerting additional variable compressive force on said bimetallic element thereby to vary the temperatures at which said bimetallic element moves between said first and second positions, a bread carriage vertically movable with respect to said frame, biasing means biasing said carriage upwardly, manually operable means for moving said carriage downwardly, switch means including a first plurality of normally open contacts adapted to be closed to electrically connect said first heating means across a source of electrical power and a second set of normally closed contacts adapted to be opened to connect said second heating means in series with said first heating means, means responsive to the position of said carriage for actuating said switch means, hook means on said carriage, a one-piece latch member pivoted to said frame having a pair of projecting fingers disposed in spaced parallel relationship for receiving a portion of said bimetallic element therebetween whereby said latch member is actuated by said bimetallic element, said latch member having a first latch bolt means engageable with said hook means to hold said carriage in its lowermost position against the return bias of said biasing means so that said switch means energizes both of said heating means until said bimetallic element is heated to one of said predetermined temperatures whereby it moves to its second position, said latch member having a second latch bolt means engageable with said hook means while said bimetallic element is in its second position to hold said carriage in an intermediate position so that said switch means energizes only said first heating means until said bimetallic element is cooled to the other of said predetermined temperatures so that it returns to its initial position thereby releasing said carriage for return to its uppermost position by the bias of said biasing means.

2. The toaster of claim 1 wherein said first and second supports define a U-shaped assembly, and wherein said means for pivoting one of said supports comprises cam means rotatable about an axis disposed substantially at the center of the bight portion of said U-shaped assembly.

3. The toaster of claim 1 wherein said spring means comprises a coiled tension spring of low spring constant connected between said vertically extending arms.

References Cited in the file of this patent

UNITED STATES PATENTS

| | | |
|---|---|---|
| 1,935,268 | Ireland | Nov. 14, 1933 |
| 2,070,108 | Bargeboer | Feb. 9, 1937 |
| 2,255,169 | Ireland | Sept. 9, 1941 |
| 2,274,810 | Sardeson | Mar. 3, 1942 |
| 2,296,115 | Mueller et al. | Sept. 15, 1942 |
| 2,303,561 | Koci | Dec. 1, 1942 |
| 2,315,327 | Gomersall | Mar. 30, 1943 |
| 2,325,551 | Scharf | July 27, 1943 |
| 2,367,044 | Newell | Jan. 9, 1945 |
| 2,392,407 | Purpura | Jan. 8, 1946 |
| 2,486,621 | White | Nov. 1, 1949 |
| 2,762,223 | Robson | Sept. 11, 1956 |
| 2,822,693 | Mulsow | Feb. 11, 1958 |
| 2,906,194 | Schwaneke | Sept. 29, 1959 |
| 2,920,550 | Schmall et al. | Jan. 12, 1960 |